United States Patent [19]

Reilly et al.

[11] 3,949,628

[45] Apr. 13, 1976

[54] METHOD AND APPARATUS IMPROVEMENTS FOR TRIMMING PLASTIC ARTICLES

[75] Inventors: Joseph R. Reilly, Naugatuck; Lars G. Schon, Bloomfield, both of Conn.

[73] Assignee: Monsanto Company, St. Louis, Mo.

[22] Filed: May 23, 1974

[21] Appl. No.: 472,638

[52] U.S. Cl. .................. 82/48; 82/100; 82/101; 82/47
[51] Int. Cl.² ................. B23B 1/00; B23B 5/14
[58] Field of Search ........... 82/46–48, 98, 82/100, 101, 102

[56] References Cited
UNITED STATES PATENTS

| | | | |
|---|---|---|---|
| 2,298,685 | 10/1942 | Davis | 82/100 |
| 3,406,598 | 10/1968 | Doucet | 82/46 |
| 3,429,211 | 2/1969 | Pelot | 82/46 |
| 3,653,285 | 4/1972 | Yoshikawa | 82/48 |
| 3,675,521 | 7/1972 | Ziegler | 82/101 |
| 3,756,128 | 9/1973 | Armstrong et al. | 82/100 |
| 3,886,824 | 6/1975 | Michel et al. | 82/47 |

*Primary Examiner*—Leonidas Vlachos
*Attorney, Agent, or Firm*—Michael J. Murphy

[57] ABSTRACT

In trimming moils from plastic articles with a blade interposed in a path along which the articles are moving while engaged with fixed and moving guides, the improvement is provided of a retractable blade assembly movable between operative and inoperative positions by fluid motor power to permit passing articles through the path either while being trimmed or not, depending on up or downstream conditions. Means may also be included for shifting one of the guides, preferably the stationary one, into and retracted from its operative position on one side of such path.

20 Claims, 8 Drawing Figures

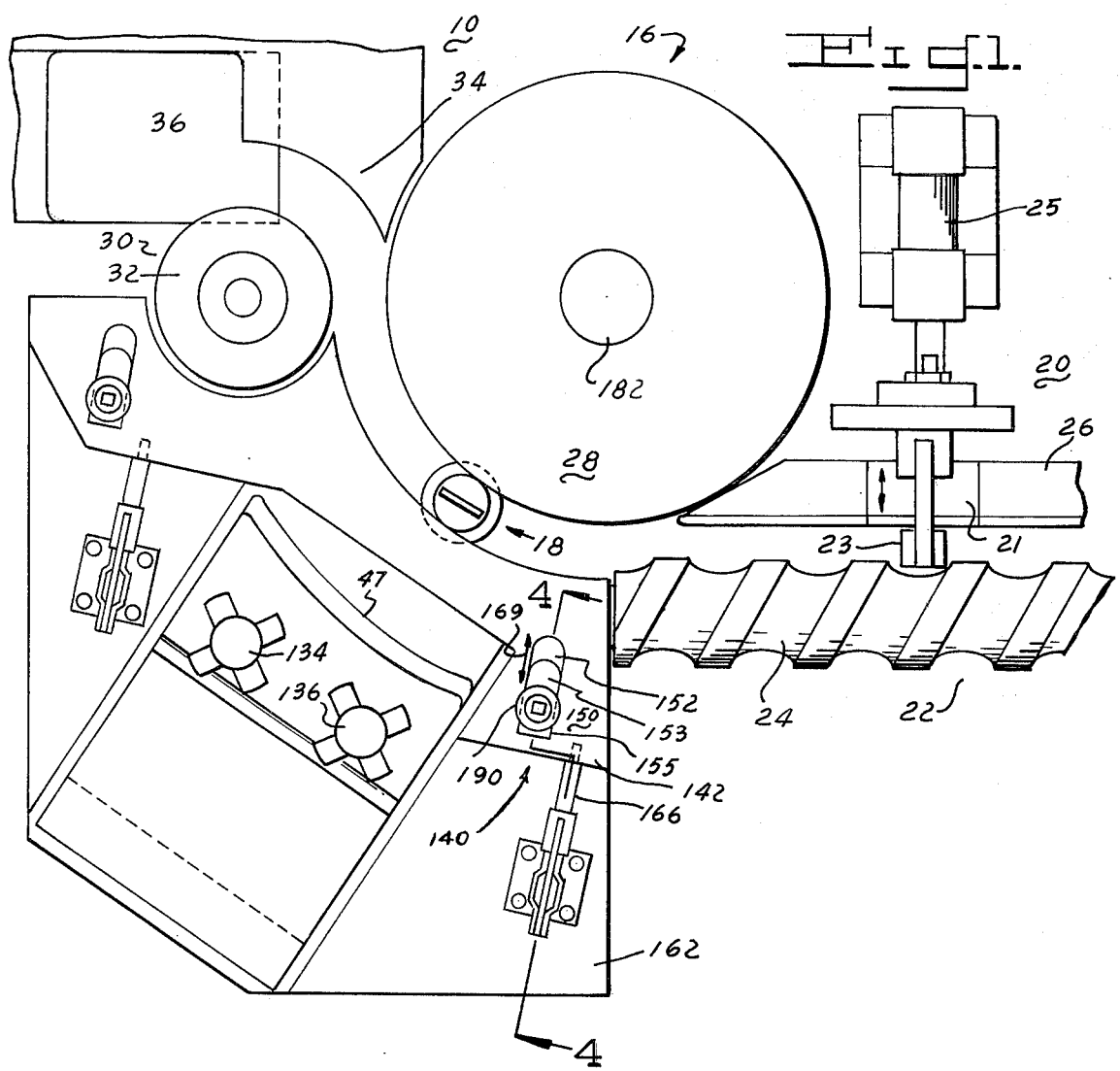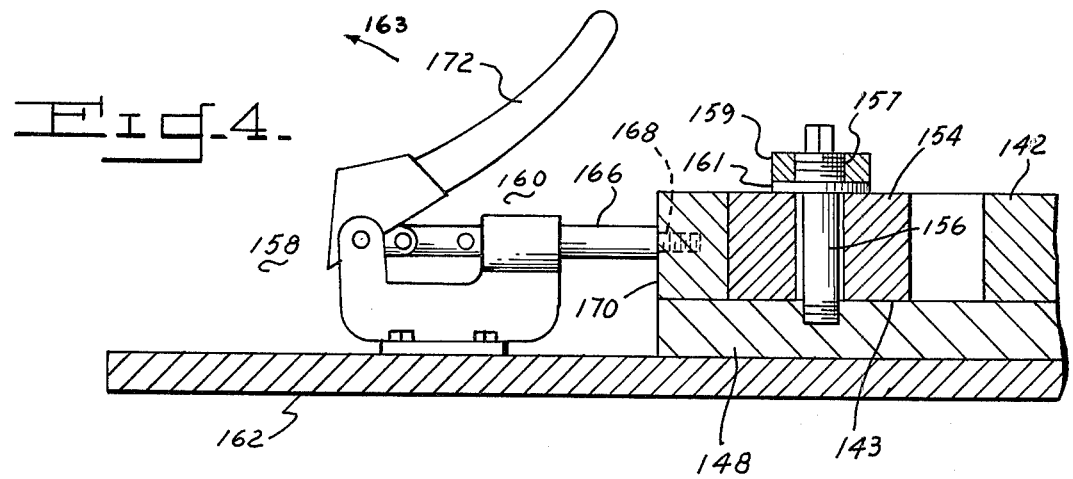

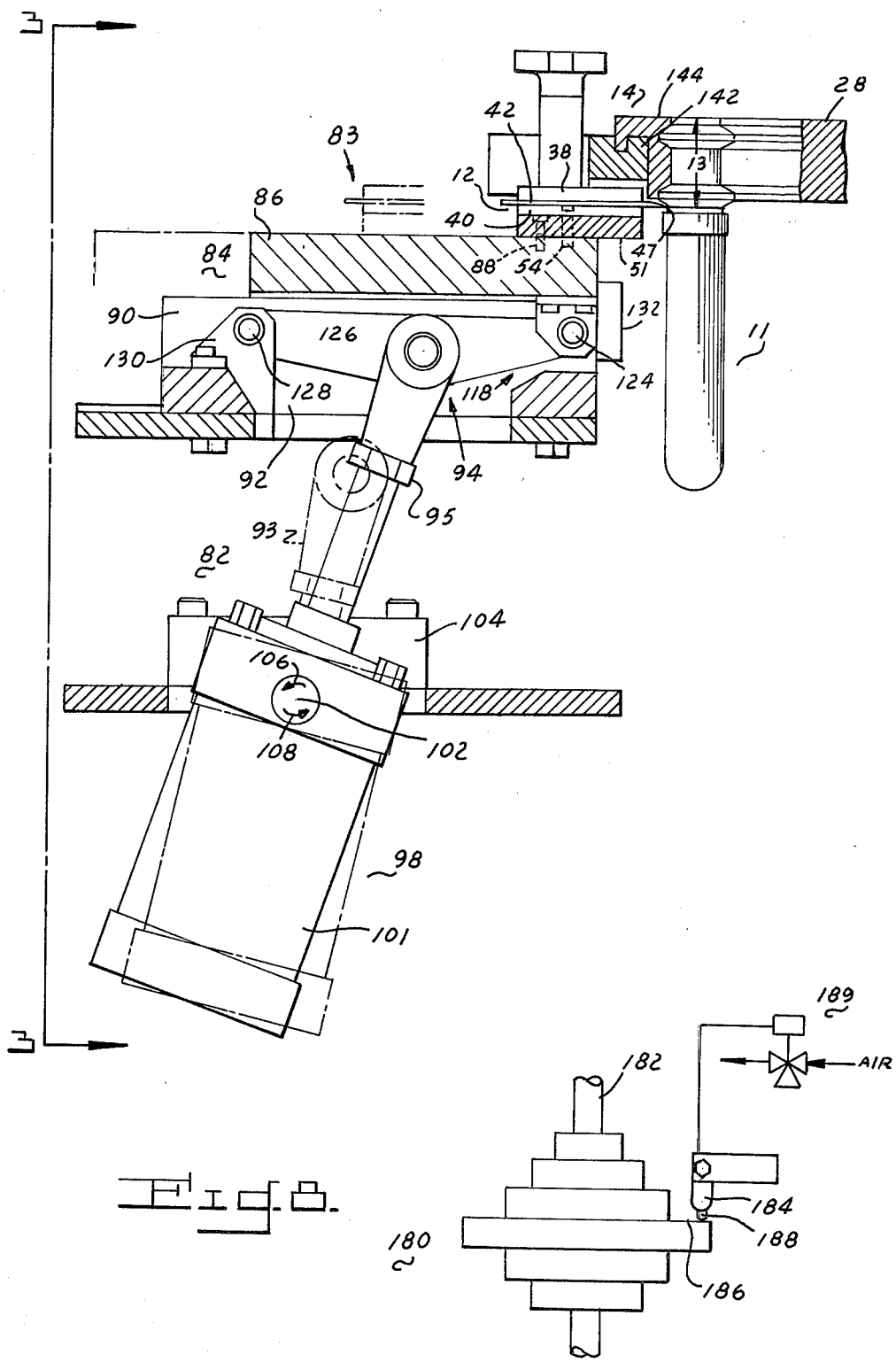

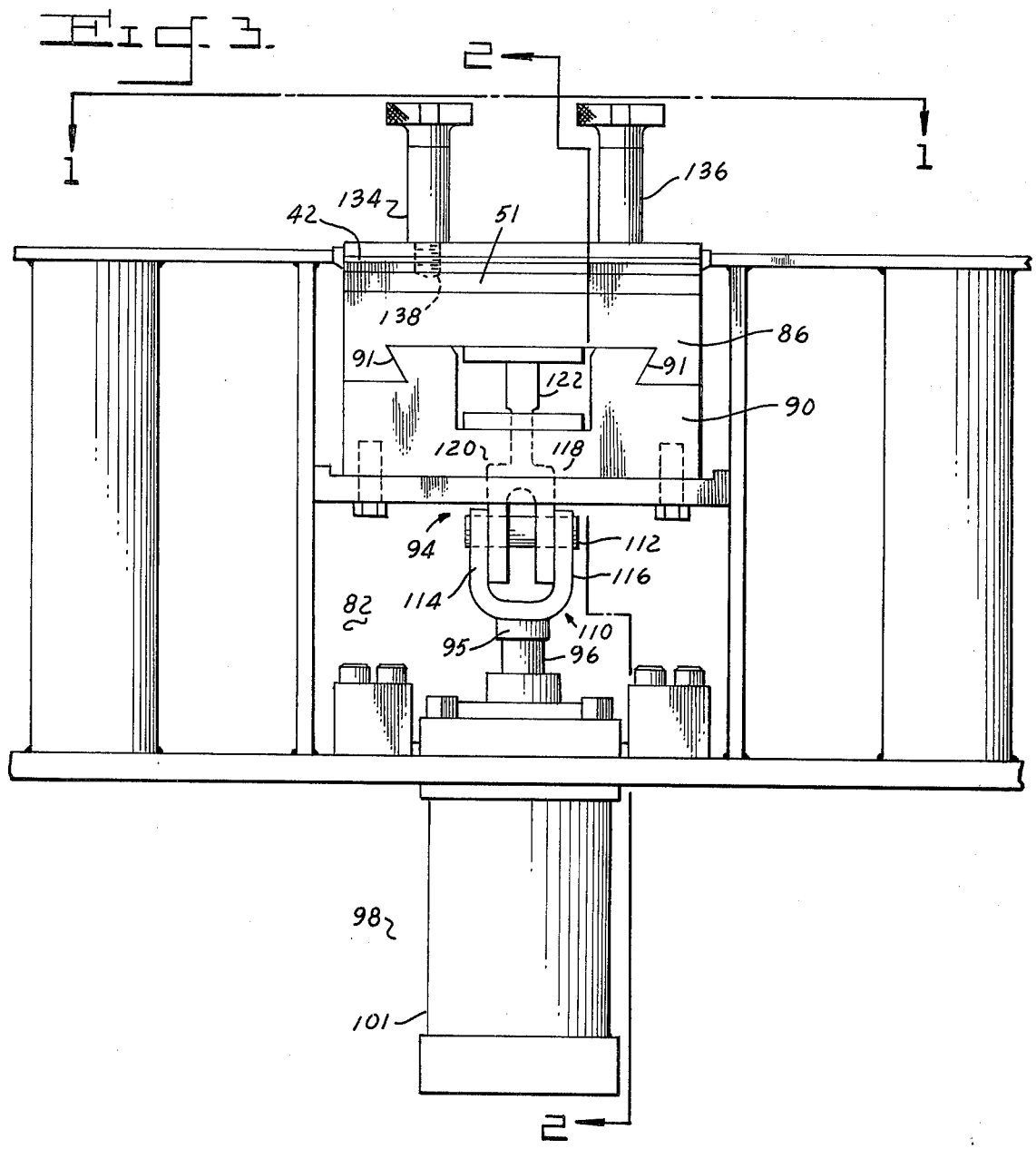

METHOD AND APPARATUS IMPROVEMENTS FOR TRIMMING PLASTIC ARTICLES

CROSS REFERENCES TO RELATED APPLICATIONS

U.S. Ser. No. 336,023, filed Feb. 26, 1973 and now U.S. Pat. No. 3,873,660.

U.S. Ser. No. 467,378, filed May 6, 1974 and now U.S. Pat. No. 3,894,454.

BACKGROUND OF THE INVENTION

This invention relates to deflashing plastic articles and more particularly to trimming moils from the necks of plastic articles with a blade as they sequentially move along a path of travel.

As disclosed in U.S. Pat. Nos. 3,406,598; 3,429,211 and 3,675,521, moils constituting unwanted plastic integrally formed with an article during molding may be removed therefrom in a downstream station by progressively cutting through the plastic as the article is advanced across a blade while engaged between fixed and moving guide members. After such trimming, the articles are usually forwarded to one or more downstream stations where other secondary operations are performed such as quality testing, labeling, decorating, bulk packaging etc.

In systems for continuously manufacturing finished articles employing the aforesaid approach to deflashing, it may occur that downstream equipment at times cannot accommodate the articles issuing from the trimming station, e.g. because of a malfunction of such equipment. Thus, with no place to put oncoming articles, it may be necessary to shut down upstream equipment until the malfunction is corrected, and this reduces the overall efficiency of the manufacturing line even though the upstream equipment is not otherwise associated with the malfunction.

Also, as disclosed in commonly assigned U.S. Ser. No. 467,378, filed May 6, 1974, such aforesaid method of trimming may be effectively used with preforms in a heat-softened condition to remove moils between a preform blow mold and a downstream temperature-conditioning or final molding station. In hot trimming these or other article configurations, the temperature of the plastic in the plane of separation of the moil should be within a certain range or else the article is preferably ejected before reaching the trimming station. But if a substantial number of consecutive articles are outside such range because, for example, of a temporary shutdown of the upstream means responsible for establishing the temperature in the moil-article joint, it will be necessary to continuously cycle the reject means for each consecutive out-of-specification article, and this can create excessive wear of the parts-ejection system, especially at high throughput rates. The previously mentioned considerations with respect to downstream equipment being out of use likewise apply to the temperature-conditioning and final molding stations in this type of hot trimming approach.

In addition, blockage of the trimming system can occur requiring costly downtime for cleanout. For example, the particular part of the article supported between the guide means, such as the neck finish, may have been under-blown in the molding station so that adequate driving force to move it across the trimming blade cannot be developed by the movable guide, and the article therefore hangs up part way across the knife. Or the blade could be sufficiently dull after substantial use such that it will no longer fully penetrate the plastic and a partially trimmed article under such conditions could again hang up part way along the trimming path. In the past such jamming in the trimming station has been alleviated by manually physically prying jammed articles out from between the closely spaced components of the apparatus and this can cause costly damage to the slicing blade.

SUMMARY OF THE INVENTION

Now, however, improvements have been developed which overcome the aforementioned prior art difficulties encountered in trimming flash from molded plastic articles.

Accordingly, it is a principal object of this invention to provide improvements in trimming apparatus of the type employing a blade for sectioning articles as they are advanced along a cutting path between opposing guide members.

An additional object is to provide improvements in apparatus of the aforementioned general type which alleviate the effect of upstream or downstream conditions on such apparatus.

A further object is to provide method and apparatus improvements in trimming systems of the aforementioned type for orderly accommodating articles continuously entering such system in a continuous manufacturing line even though downstream equipment may be temporarily shut down.

A specific object of this invention is to provide improvements in apparatus of the aforementioned general type which facilitate cleaning out jams and quickly changing the blade member so as to minimize downtime of the apparatus.

Other objects of this invention will in part be obvious and will in part appear hereinafter when considered with respect to the detailed description and accompanying drawings.

These and other objects are accomplished in apparatus for trimming moils from plastic articles as they move along a path of travel, which comprises knife means including a blade for trimming, stationary guide means and movable guide means extending along such path for engagement of each article between them to transport such articles along the path while in cutting engagement with the blade by providing the improvement which comprises means for reciprocating the knife means with respect to the stationary guide means to move the blade into and out of operative cutting position, thereby permitting articles to be moved through the path by the stationary and movable guide means either while in or out of engagement with the blade.

The apparatus may include means for mechanically shifting one of the guide means, preferably the stationary one, into and out of its operative position on one side of the path and for locking such guide means in place adjacent such path.

From a process standpoint, there is provided in the process of trimming moils from plastic articles by progressively penetrating through the plastic with a sharp edge interposed in a path of travel along which the articles are being advanced in frictional rolling engagement with fixed and movable guide members and then feeding the severed moils in an orderly manner to a downstream recovery area, the improvement which comprises retracting the sharp edge out of the path of travel while keeping the fixed and stationary guide members in place to permit untrimmed preforms exiting the path to be fed to the recovery area in an orderly manner.

DETAILED DESCRIPTION OF THE DRAWINGS

In describing the invention reference will be made to the accompanying drawings wherein:

FIG. 1 is a plan view of apparatus embodying the present invention in the direction 1-1 of FIG. 3 showing the knife assembly in retracted position;

FIG. 2 is a sectional view along 2—2 of FIG. 3 showing the knife assembly in its forward operative position;

FIG. 3 is an elevational view along 3—3 of FIG. 2;

FIG. 4 is a sectional view along 4—4 of FIG. 1;

FIG. 8 is a schematic view of components for automating portions of the system of FIG. 1.

DETAILED DESCRIPTION OF ILLUSTRATED EMBODIMENTS

Figure 5:
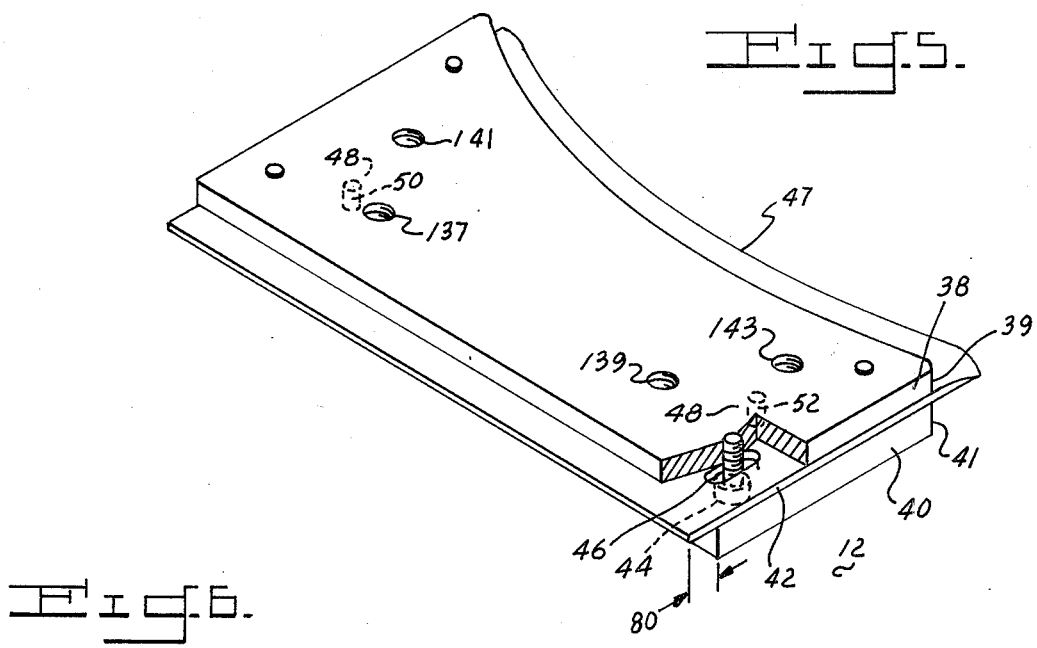
FIG. 5 is a perspective view of a knife magazine assembly useable in the apparatus of FIGS. 1–4.

Referring now to the drawings, there is shown in FIGS. 1–4, apparatus generally indicated as 10 for trimming moils from plastic articles 11. Apparatus 10 is equipped according to the present invention with retractable knife and retractable anvil assemblies and includes a single knife means 12 (FIGS. 2 and 5), fixed or stationary, non-rotative guide means 14 (FIG. 2) located, in the illustrated embodiment, above knife means 12, and movable guide means 16 opposite fixed guide means 14 which includes rotatably mounted wheel 28. Means 14 and 16 extend along and define a path 18 closed on each side between them and function to engage each article 11 between them, for example in the moil area 13 (FIG. 2) thereof, so as to transport them along path 18 while in cutting engagement with knife means 12. Alternatively, knife means 12 could be arranged on the side of path 18 on which movable guide means 16 is located. Though means 14 and 16 are arcuate in lengthwise contour so that path 18 is curved, they could as well be straight so as to form a linear cutting path. Means 22 feed articles to be trimmed to knife means 12 in the deflashing station, and in the illustrated embodiment (FIG. 1) comprises screw conveyor 24 and adjacent, opposite, support bar 26 which sequentially advance articles 11 between them and deposit them at the inlet to path 18 for rolling engagement, as illustrated in FIG. 2, with wheel 28 of the movable guide means. Means 20 may be provided upstream of the deflashing station for rejecting out-of-specification articles which in the illustrated embodiment, comprises a retractable portion 21 of article support bar 26 for creating a discontinuity in such bar when in retracted position and a reciprocable plunger 23, each of which may be operated by one or more suitable conventional actuating mechanisms such as a fluid motor 25.

Means 30 downstream of knife means 12 direct severed moils and untrimmed articles exiting path 18 toward a recovery system, and comprises rotatably mounted moil discharge drive wheel 32 and opposite moil discharge anvil 34 forming between them a curved path discharging into chute 36 which feeds such a recovery system, not shown.

In accordance with the present invention, knife means 12 comprises a magazine assembly (FIG. 5) which includes upper 38 and lower 40 mounting plates and knife or blade 42 secured therebetween by a plurality of cap screws 44. Blade 42 has elongated, through slots 46 which allow adjusting the blade position with respect to plates 38 and 40 in a manner to be described. At least one of plates 38 and 40 includes means 48 for cooperating with mating structure to be later defined to register the lateral position of the front faces 39, 41 of plates 38, 40 (FIG. 2) and therefore of the blade 42 at the left hand side of path 18 (FIG. 2) when the assembly is installed beneath fixed guide means 14. The position of blade 42 between plates 38, 40 to provide the desired position of cutting edge 47 in path 18 is set via slots 46 before tightening screws 44. Such projection into the path is usually determined experimentally as that providing optimum penetration into the plastic at the plane of separation as the article is advanced along path 18. Such means 48 in the illustrated embodiment, comprises a pair of through holes 50, 52 in lower plate 40 for accepting mounting pins 54 (FIG. 2) protruding upwardly from spacer plate 51 of the slide assembly, to be further described.

To minimize downtime of the trimming system for changing cutting blades 42, provisions may be made to preassemble a plurality of knife means or magazine assemblies 12 wherein the position of cutting edge 47 of each blade 42 is preset off-line or outside apparatus 10 such that it will protrude the exact desired amount into path 18 for optimum cutting of the particular size article being trimmed when the assembly 12 is installed in operating position in the system. In this way a knife magazine assembly 12 may be quickly removed from the system and replaced with another which does not require any adjustment at all before restarting the system. To accomplish this, jig 58 (FIGS. 6 and 7) may be provided which comprises flat planar fixture 60 set up off line on a suitable support surface and having a pair of dowel pins 62, 64 laterally spaced from each other and extending upwardly from its top surface. Distance 61 between dowel pins 62, 64 is the same as that between holes 50, 52 in lower plate 40 and that between mounting pins 54 in spacer plate 51 (FIG. 2). A pair 66, 68 of setting pins slip fitted into corresponding holes in fixture 60 forward of dowel pins 62, 64 are positioned on an arc 67 corresponding to the curvature of path 18, though for a straight path they could be coplanar with each other. Thus, predetermined dimensions 69, 76 of fixture 60 are established as corresponding to the portion of blade 42 forward of holes 50, 52 in plate 40 of knife means 12 when the blade 42 is secured thereto in operating position. Square-up pins 78 also projecting up from fixture 60 function to square up the sides of a blade 42 when assembling a magazine in a manner to be now described. To assemble a magazine 12 off line, bottom plate 40 is placed on top of fixture 60 such that dowel pins 62, 64 pass through holes 50, 52 therein. A blade 42 is next placed atop plate 40 and slid forward or positioned relative to plate 40 such that cutting edge 47 abuts setting pins 66, 68 (which may be made of a soft material to avoid damaging such edge during assembly) and side 75 abuts square-up pins 78, whereupon top plate 38 is then placed on blade 42 and the sandwich fastened together with cap screws 44. When such magazine 12 is later mounted in operative position on pins 54 in apparatus 10, cutting edge 47 will be in the exact location desired in cutting path 18.

Figure 6:
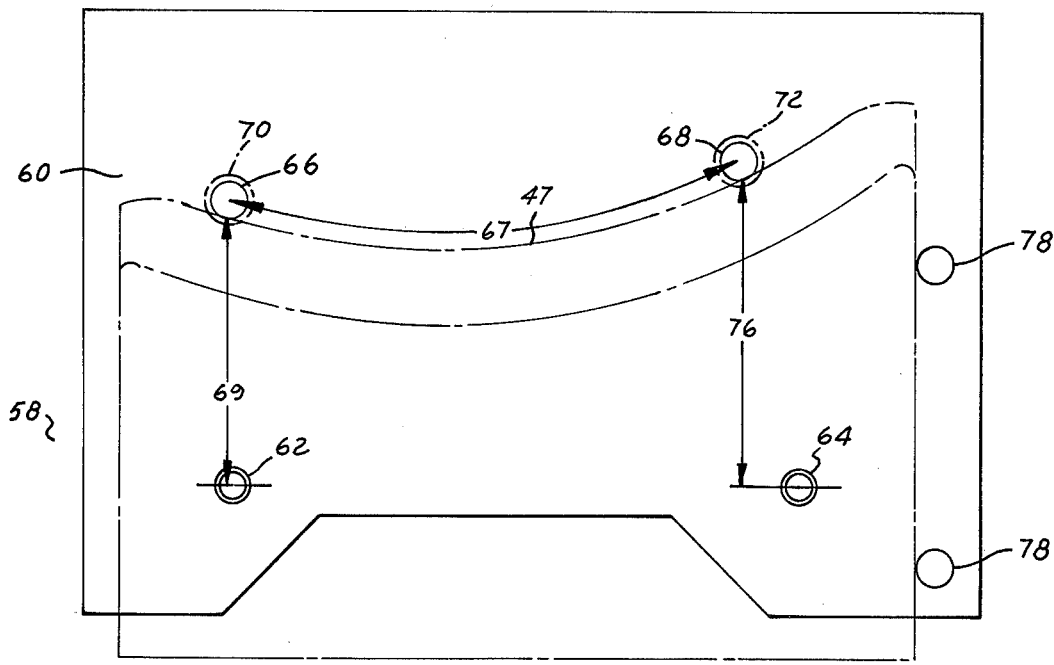
FIGS. 6 and 7 are plan and elevational views respectively of apparatus for assemblying the magazine of FIG. 5.
Figure 7:
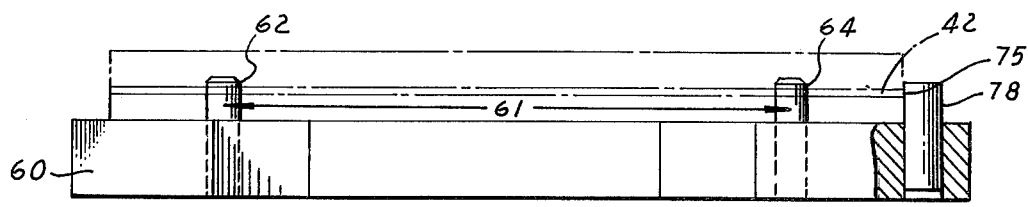

Collars 70, 72, shown in phantom in FIG. 6, fitted over setting pins 66, 68 and abutting the top face of fixture 60 may be used, with suitable compensation for their thickness made in dimensions 69, 76 to provide flexibility to the setting defined by the position of pins 66, 68, in that their outer surface may be machined to vary dimensions 69, 76 to thereby change the position of cutting edge 47 in path 18. Blade 42 may be somewhat wider than that necessary for an initial setting of the forward cutting edge in a direction laterally perpendicular to the path 18, so that a portion 80 is available to compensate for that which might be machined away during one or more resharpenings after wear or damage of the cutting edge.

Referring now to FIGS. 2 and 3, means 82 are provided for reciprocating knife means 12 with respect to stationary guide means 14 to selectively move blade 42 into and out of operative cutting position in path 18, such positions being shown in full lines in FIG. 2 and in phantom lines at 83 therein. Means 82 comprises slide assembly 84 which includes elongated slide member 86 extending laterally back from blade 42 and path 18, carrying knife means 12 secured on its forward end. Bolts 88 fasten spacer plate 51 to member 86, plate 51 in turn carrying knife means 12 via pins 54 seated in holes 50, 52 of lower mounting plate 40. Stationary block 90 (FIG. 3) supports member 86 for sliding movement along mating angled faces 91. Block 90 is centrally cut away at 92 (FIG. 2) to accommodate link assembly 94 connecting slide member 86 with an end portion of piston rod 96 of fluid motor means 98. The latter includes a fluid motor comprising housing 101 pivotally mounted at 102 to mounting plate 104 for oscillation in the direction of arrows 106, 108 beneath slide member 86. Though it may be manually actuated, the fluid motor is preferably operated via an automated position-controlling instrument circuit comprising a conventional electrically actuated solenoid valve mounted for operation in a pressurized air line operatively associated with a piston portion (not shown) within housing 101. Link assembly 94 includes a toggle mechanism comprising clevis 110 secured via extension 95 to the end of piston rod portion 96 having fixed cross pin 112 spanning branches 114, 116 of a Y-shaped portion thereof. Slide toggle link 118 has forked portion 120 movably pivoted on cross pin 112 and another portion at its opposite end 122 pivotally secured at 124 to slide member 86. Stationary toggle link 126 is pivotally mounted at 128 to stationary support 130 and movably pivoted at its other end to cross pin 112 intermediate the fingers of forked portion 120. Stop plate 132 in front of slide toggle link 118 is secured to a suitable structural support member, not shown, and positively delimits forward movement of slide member 86 such that the position of edge 50 of blade 42 in path 18 is accurately established by the abutment of member 86 with stop plate 132 and is not subject to any variability due to wear of the moving parts of toggle mechanism 94. As mentioned, projecting means comprising dowel pins 54 associated either with slide member 86 or spacer plate 51 are seated in alignment holes 50, 52 in the lower mounting plate of knife means 12. Any suitable means such as a pair of hand wheels 134, 136 tapped on their forward ends at 138 (FIG. 3) for threaded engagement in tapped sockets in slide member 86 through similar sockets 137, 139 in mounting plates 38, 40 may be used to releasably secure knife means 12 to the forward end of slide member 86 or to spacer plate 51 which in turn is secured to member 86. When a magazine 12 is being removed from position on slide member 86 after actuation of housing 101 to the position shown in outline form at 93 in FIG. 2 it may be necessary to pry it off and this is facilitated by unscrewing hand wheels 134, 136 through sockets 137, 139 in the blade mounting plates and then inserting them in adjacent threaded sockets 141, 143 which open onto a flat untapped top surface portion of slide member 86 or spacer plate 51, such that when knobs 134, 136 are then threaded down through sockets 141, 143 the forward ends abut such untapped top surface with continued advancement causing knife means 12 to be pried upwardly therefrom.

Referring now particularly to FIGS. 1, 2 and 4, in accordance with another aspect of the invention, means generally indicated as 140 may be provided for shifting one of the guide means 14 or 16 toward and away from its operative position at the side of the path of travel 18 of the articles. Such means 140 may be designed to operate independently of or in conjunction with the means 82 for shifting knife means 12. In the illustrated embodiment, the stationary guide means 14 is the one which is mechanically reciprocable, such means 14 including a support member or mounting plate 142 (FIG. 2) to which anvil member 144 is secured via suitable bolts, not shown. Means for shifting plate 142 toward and away from path 18 and for locking it in position at least at the forward extremity of such movement comprise bed plate 148 slidably supporting mounting plate 142 along interface 143, means 150 for releasably securing mounting plate 142 to bed plate 148 and which are disengaged during shifting movement and means 158 for transmitting manual shifting force to mounting plate 142, though such movement might alternatively be accomplished in an automated fashion. These collective means will be described and numbered with respect to the portion situated on the right side in FIG. 1 only, it being understood that for the version shown in the illustrated embodiment, a duplicate set of parts is provided for the portion situated on the left side in FIG. 1. Means 150 comprises an elongated slot 152 milled in a winged portion of mounting plate 142 in which an alignment and stop block 154 is situated and adapted to slidably engage face 155 of slot 152 in closely conforming contact during shifting movement. Threaded member 156 secures block 154 to bed plate 148 as shown in FIG. 4 and has an enlarged end portion threaded at 157 to accept nut 159 which releasably seals washer 161 having side portions 190 overhanging the top face of support plate 142 to the latter. Means 158 in the illustrated embodiment comprises a toggle clamp assembly 160 anchored to frame 162 having an extendable and retractable handle-operated plunger portion 166 secured at 168 in a tapped socket in rear face 170 of mounting plate 142 rearward of slot 152, for shifting mounting plate 142 in directions 169, with respect to blocks 154. Toggle clamp assemblies are commercially available, for example, Model No. 160 obtainable from Detroit Stamping Company of Detroit, Michigan, has been used. Thus, when handle 172 of each assembly 160 is manually raised in the direction of arrow 163 in FIG. 4, after threading nut 159 upwardly on fixed member 156 to release washer 161, and therefore block 154 with respect to support plate 142, mounting plate 142 to which plunger 166 is attached is drawn to the rear away from path 18, with aligned movement provided via relative shifting contact between face 155 of slot 152 and the opposite, relatively freely mounted non-binding surface of block 154, until the curved end 153 of block 154 abuts against the opposing curved surface of slot 152. Lowering handle 172 in the opposite direction accomplishes the reverse — i.e., plate 142 and the parts it supports are shifted forward until the position of FIGS. 1 and 4 are reached, whereupon nut 155 is threaded down on member 156 to clamp support plate 142 and block 154 together via overhung portions 190 of washer 161. The compression generated by clamp assembly 160 insures tight abutment of the opposing flat surfaces of slot 152 and block 154 when the anvil member 144 is in the forward operative position of FIGS. 1 and 4.

FIG. 8 illustrates a typical, commercially available torque limiting device 180 on shaft 182 which supports wheel 28 of movable guide means 16 (FIG. 1). As long as rotary contact of surface 186 of device 180 against tip 188 of switch 184 is maintained, i.e., the torque on shaft 182 is less than the setting on device 180, power from a suitable source, not shown, will continue to be transmitted through device 180 and wheel 28 will continue to rotate. When such rotary movement ceases because the torque on shaft 82 is excessive due, for example, from a dull edge 47 on blade 42, an underblown moil section 13 etc., switch 184 electrically activates solenoid valve 189 in the air line supplying fluid motor housing 101 in a conventional manner, thereby automatically shifting knife means 12 to the inoperative position shown at 83 in FIG. 2, out of cutting path 18. Suitable alarm means can be conventionally provided to alert an operator as to when this occurs. When the cause of generating excessive torque on shaft 182 has been eliminated, knife means 12 can be shifted forwardly into operative position via a conventional manually operated electrical switch, not shown, in order to allow trimming to commence again.

In overall operation, as plastic articles 11 sequentially proceed through path 18 in frictional rolling engagement with the periphery of wheel 28 and the opposing surface of anvil portion 144, sharp edge 47 of blade 42 penetrates through the plastic in the joint between moil 13 and the rest of the article. After moils 13 (FIG. 2) have been severed from articles 11, each one in the illustrated embodiment is engaged between wheel 32 and moil discharge anvil 34 and conveyed away from the deflashing station to chute 36 feeding a recovery station. When it is desired to continue to operate the system upstream of the deflashing station, but for some reason equipment downstream of the trimming station for further processing articles 11 after trimming is shut down, knife means 12 is caused, either manually or automatically via an override switch if necessary, to be retracted away from path 18 such that edge 47 does not project therein, while independently operable anvil portion 144 is left in place in operative position with respect to wheel 28, thereby permitting untrimmed preforms exiting path 18 to be fed to chute 36 via engagement of the still-attached moils 13 with moil discharge wheel 32 and anvil 34.

The above description and particularly the drawings are set forth for purposes of illustration only and are not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. In apparatus for trimming moils from plastic articles as they move along a path of travel, which comprises knife means including a blade for said trimming, stationary guide means including a non-rotative anvil member and movable guide means, said stationary and moveable guide means extending along and defining a path closed on each side between them for engagement of each article to transport such articles along said path while in cutting engagement with the blade, the improvement which comprises moil discharge means downstream of the knife means for directing severed moils and untrimmed articles exiting said path toward a recovery system and means for reciprocating the knife means with respect to the guide means to move the blade into and out of operative cutting position, thereby permitting articles to be moved through the path by the stationary and movable guide means either while in or out of engagement with the blade.

2. The apparatus of claim 1 wherein said means for reciprocating the knife means includes a position-controlling instrument circuit operable to move the knife means independently of the stationary guide means.

3. The apparatus of claim 1, further including means for reciprocating one of said guide means toward and away from the path of travel.

4. The apparatus of claim 1 wherein said knife means comprises a magazine assembly including upper and lower mounting plates having said blade secured between them, at least one of said plates having means for registering the lateral position of the cutting edge of the blade in said path.

5. The apparatus of claim 1 wherein said means for reciprocating the knife means includes:
   A. a slide assembly comprising an elongated slide member carrying the knife means and a stationary block slidably supporting said member;
   B. fluid motor means for generating movement of the slide member; and
   C. a link assembly operatively connecting the slide member and a fluid motor portion of the fluid motor means.

6. The apparatus of claim 3 wherein said one of said guide means is the stationary guide means.

7. The apparatus of claim 5 including a stop plate for delimiting advancing movement of the slide member.

8. The apparatus of claim 5 wherein said fluid motor means includes a position-controlling instrument circuit.

9. The apparatus of claim 5 wherein said fluid motor means includes a fluid motor pivotally mounted for oscillation beneath the slide member.

10. The apparatus of claim 5 including knife assembly securing means for releasably attaching said knife assembly to the slide member.

11. The apparatus of claim 5 including projecting means associated with said slide member for cooperating with the knife means to laterally position said knife means with respect to said path.

12. The apparatus of claim 11 wherein said projecting means comprise dowel pins for insertion into alignment holes in said knife means.

13. In apparatus for trimming moils from plastic articles as they move along a path of travel, which includes knife means to accomplish said trimming, stationary guide means and movable guide means extending along said path for engaging each article between them to transport them along said path while in cutting engagement with the knife means, the improvement wherein said stationary guide means comprises:
  A. an anvil member for engaging the articles during trimming;
  B. a support member mounting the anvil member; and
  C. means for mechanically shifting said support member toward and away from said path and for locking said support member in operative position adjacent said path comprising:
    i. a bed plate slidably supporting the support member;
    ii. elongated slots in the support member;
    iii. alignment blocks in the slots adapted to slidably engage the walls thereof;
    iv. threaded members releasably securing the guide blocks and support members to each other; and
    v. toggle clamp assemblies having extendable and retractable plunger portions secured to a rear face of the support member.

14. In apparatus for trimming moils from plastic articles as they move along a path of travel, which comprises knife means including a blade for said trimming, stationary guide means and movable guide means extending along said path for engagement of each article between them to transport such articles along said path while in cutting engagement with the blade, the improvement which comprises means for reciprocating the knife means with respect to the guide means to move the blade into and out of operative cutting position, thereby permitting articles to be moved through the path by the stationary and movable guide means either while in or out of engagement with the blade;
  said means for reciprocating the knife means including:
  A. a slide assembly comprising an elongated slide member carrying the knife means and a stationary block slidably supporting said member;
  B. fluid motor means for generating movement of the slide member;
  C. a link assembly operatively connecting the slide member and a fluid motor portion of the fluid motor means including:
    i. a clevis on a piston rod portion of the fluid motor means having a fixed cross pin spanning the branches of a y-shaped portion thereof;
    ii. a slide toggle link having a forked portion pivotally mounted on said cross pin and another portion pivotally secured to such slide member; and
    iii. a stationary toggle link pivotally mounted at one end to a stationary support and at the other end to said cross pin.

15. In apparatus for trimming moils from plastic articles as they move along a path of travel, which comprises knife means including a blade for said trimming, stationary guide means and movable guide means extending along said path for engagement of each article between them to transport such articles along said path while in cutting engagement with the blade, the improvement which comprises:
  means for reciprocating the knife means with respect to the guide means to move the blade into and out of operative cutting position, thereby permitting articles to be moved through the path by the stationary and movable guide means either while in or out of engagement with the blade; and
  means for reciprocating the stationary guide means toward and away from the path of travel comprising:
    i. a bed plate slidably supporting said stationary guide means;
    ii. alignment means mounted for movement relative to slots in the stationary guide means; and
    iii. at least one clamp assembly secured to the stationary guide means rearward of said slots for shifting said stationary guide means with respect to said alignment means on said bed plate.

16. The apparatus of claim 15 wherein said alignment means comprises elongated blocks in surface engagement with the walls of said slots.

17. The apparatus of claim 15 wherein said clamp assembly comprises a toggle clamp mechanism.

18. In apparatus for trimming moils from the necks of plastic articles as they move along a path of travel which includes knife means to accomplish said trimming, stationary guide means and movable guide means extending along said path for engagement between them of the moil of each article to transport them along said path while in cutting engagement with the knife means the improvement which comprises:
  A. means for automatically moving the knife means away from said path in response to a stopped condition of the movable guide means; and
  B. means for shifting the stationary guide means toward and away from said path independent of the means for automatically moving the knife means.

19. The apparatus of claim 18 wherein:
  A. said means for automatically reciprocating the knife means includes:
    i. a slide assembly comprising an elongated slide member carrying the knife means and a stationary block slidably supporting said member;
    ii. fluid motor means for generating movement of the slide member;
    iii. a link assembly operatively connecting the slide member and a piston rod portion of the fluid motor means; and
    iv. a stop plate for delimiting advancing movement of the slide member; and
  B. said means for reciprocating the stationary guide means toward and away from the path of travel includes:
    i. a bed plate slidably supporting said stationary guide means;
    ii. means releasably securing said stationary guide means to the bed plate;
    iii. alignment means mounted for relative movement with respect to slots in the stationary guide means; and
    iv. at least one clamp assembly having an extendable and retractable plunger secured to the stationary guide means rearward of said slots.

20. In apparatus for trimming moils from plastic articles as they move along a cutting path which includes a single knife means to accomplish said trimming, movable guide means for engaging and transporting each article along said path while in cutting engagement with the knife means, the improvement which comprises:
  means for automatically moving the knife means away from said path in response to a stopped condition of the movable guide means.

* * * * *